(12) United States Patent
Arnault et al.

(10) Patent No.: US 12,512,734 B2
(45) Date of Patent: Dec. 30, 2025

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR)

(73) Assignee: AKTIEBOLAGET SKF, Gothenburg (SE)

( * ) Notice: Subject to any disclaimer, the term of this patent is extended or adjusted under 35 U.S.C. 154(b) by 334 days.

(21) Appl. No.: 18/472,368

(22) Filed: Sep. 22, 2023

(65) Prior Publication Data

US 2024/0128840 A1    Apr. 18, 2024

(30) Foreign Application Priority Data

Oct. 12, 2022 (FR) ....................................... 2210447

(51) Int. Cl.
*H02K 11/40* (2016.01)
*H01R 39/38* (2006.01)
*H02K 5/173* (2006.01)

(52) U.S. Cl.
CPC ........... *H02K 11/40* (2016.01); *H01R 39/385* (2013.01); *H02K 5/173* (2013.01)

(58) Field of Classification Search
CPC .......... H02K 11/40; H02K 5/173; H02K 7/08; H02K 2205/03; H02K 13/00; H02K 5/145;

(Continued)

(56) References Cited

U.S. PATENT DOCUMENTS

| 7,193,836 B2* | 3/2007 | Oh | H02K 11/40 |
| | | | 361/220 |
| 8,189,317 B2* | 5/2012 | Oh | H02K 11/40 |
| | | | 310/309 |

(Continued)

FOREIGN PATENT DOCUMENTS

| FR | 3108955 A1 | 10/2021 |
| FR | 3108956 A1 | 10/2021 |
| FR | 3120754 A1 | 9/2022 |

OTHER PUBLICATIONS

Preliminary Search Report from the French Patent Office dated May 26, 2023 in related French application No. FR2210447, including Search Report and Written Opinion.

*Primary Examiner* — Tulsidas C Patel
*Assistant Examiner* — Mohammed Ahmed Qureshi
(74) *Attorney, Agent, or Firm* — J-TEK LAW PLLC; Scott T. Wakeman; Mark A. Ussai

(57) ABSTRACT

A grounding brush assembly includes a brush having a plurality of conductive fibers and a support having a mounting portion housing conductive fibers and first and second lateral lips extending from the mounting portion and axially gripping the conductive fibers. The assembly includes a mounting plate connected with the support and provided with at least one radial portion extending radially outwardly from the mounting portion of the support. The mounting plate has an axial portion extending axially from the radial portion, at least partly radially surrounding the mounting portion of the support and being spaced radially apart radially from the mounting portion. Further, a retaining portion extends radially inwardly from the axial portion.

16 Claims, 3 Drawing Sheets

(58) Field of Classification Search
CPC ........ H02K 5/15; H02K 13/10; H01R 39/385; H01R 39/24; H01R 39/20; H01R 39/39; F16C 19/06; F16C 2380/26; F16C 41/002
See application file for complete search history.

(56) References Cited

U.S. PATENT DOCUMENTS

| | | | |
|---|---|---|---|
| 8,199,453 B2* | 6/2012 | Oh ........................ | H02K 11/40 361/220 |
| 2005/0011718 A1 | 1/2005 | Arnault | |
| 2019/0296617 A1 | 9/2019 | Hubert et al. | |
| 2021/0021180 A1 | 1/2021 | Hubert et al. | |
| 2021/0088076 A1 | 3/2021 | Knoblauch | |
| 2021/0310517 A1 | 10/2021 | Berruet et al. | |
| 2021/0310518 A1 | 10/2021 | Berruet et al. | |
| 2022/0294319 A1 | 9/2022 | Arnault et al. | |

* cited by examiner

GROUNDING BRUSH ASSEMBLY

CROSS-REFERENCE

This application claims priority to French patent application no. 2210447 filed on Oct. 12, 2022, the contents of which are fully incorporated herein by reference.

BACKGROUND OF THE INVENTION

The present invention relates to grounding devices, and more particularly to grounding brush assemblies for controlling the shaft current generated in electric motors or machines.

In an electric motor or machine, at least one rolling bearing is mounted between the casing or housing of the motor, or of another electric machine, and a rotary shaft of the motor/machine in order to rotatably support the shaft. During motor operation while the shaft is rotating, an electrical potential difference between the shaft and the casing of the motor or other electric machine may form or appear, which may cause electric current to flow between the inner ring of the rolling bearing, which is secured to the rotary shaft, and the bearing outer ring secured to the casing. Such electrical currents passing through the rolling bearing can damage the bearing components, notably the rolling elements and the rolling paths or raceways formed on the inner and outer rings. These electrical discharges can also generate vibrations.

To remedy these drawbacks, it is known to "earth" or ground the rotary shaft by using a brush or a grounding brush that includes conductive fibers. Such a grounding brush is generally mounted in the bore of the casing of the electric motor so that the free ends of the fibers are in radial contact with the outer surface of the rotary shaft.

Through the conductivity of the fibers, the brush is maintained at the same electrical potential as the casing of the electric motor. The inner and outer rings of the rolling bearing are also at the same electrical potential, which reduces, and preferably eliminates, the problematic electrical discharges through the rolling bearing.

US patent publication no. 2021/0021180 A1 discloses a grounding brush assembly comprising a grounding brush provided with a support and a plurality of conductive fibers mounted in the support, and an annular mounting plate provided with a plurality of tongues for radially and axially retaining the support of the grounding brush and an annular outer flange radially surrounding the brush and the tongues. The tongues are formed by plastic deformations of the mounting plate. However, such a grounding brush assembly is not suitable when the bearing is mounted axially "free" inside the casing of the motor and preloaded axially by a spring.

SUMMARY OF THE INVENTION

The present invention aims to remedy the above noted drawback and relates to a grounding brush assembly comprising a grounding brush provided with a plurality of conductive fibers and a support including a mounting portion inside which the conductive fibers are housed, and first and second lateral lips prolonging the mounting portion and axially gripping the conductive fibers. The assembly includes a mounting plate connected with the support, either integrally formed with or separate and attached, and provided with at least one radial portion extending radially outward with respect to the mounting portion of the support.

According to a general feature of the present invention, the mounting plate also includes at least one axial portion extending axially from the radial portion, at least partially radially surrounding the mounting portion of the support and being spaced apart radially from the mounting portion, and at least one retaining portion extending radially inwardly from the axial portion. Preferably, the retaining portion of the mounting plate extends from a free end of the axial portion of the mounting plate.

Preferably, the radial portion of the mounting plate extends entirely radially and the axial portion of the mounting plate extends entirely axially. Also, the retaining portion of the mounting plate preferably extends entirely radially.

In one embodiment, the mounting plate includes a plurality of radial portions spaced apart from each other in the circumferential direction. Alternatively, the mounting plate can comprise a single annular radial portion or not.

In one embodiment, the mounting plate and the support are produced in a single piece, i.e., the mounting plate and the support are formed of one-piece construction.

In another embodiment, the mounting plate comprises a plurality of tongues for the axial and radial retention on the support. In such an embodiment, the mounting plate and the support are two distinct or separate parts.

Preferably, the radial portion of the mounting plate, the axial portion of the mounting plate, the retaining portion, the first and second lateral lips and the mounting portion each have an annular form. Alternatively, the radial portion of the mounting plate, the axial portion of the mounting plate, the retaining portion, the first and second lateral lips and the mounting portion can extend over an angular segment less than 360°.

Preferably, the grounding brush assembly also comprises a spring disposed at least partially axially between the radial portion and the retaining portion of the mounting plate, and disposed at least partially radially between the mounting portion of the support and the axial portion of the mounting plate, the retaining portion of the mounting plate engaging with at least one of the coils of the spring for the axial retention of the spring relative to the mounting plate.

The present invention also relates to an electric machine or motor comprising a casing, a shaft, a grounding brush assembly as defined above and mounted radially between the casing and the shaft, at least one bearing interposed between the shaft and the bore of the casing, a retainer secured to the casing, the spring being interposed axially between the radial portion of the mounting plate and the retainer, the conductive fibers of the assembly being in contact with the shaft, a radial play remaining between the mounting plate and the bore of the casing.

The present grounding brush assembly enables mounting the bearing axially free inside the casing of the motor while maintaining the capability of dissipating any electric charge that accumulate on the shaft. When the motor is operating, the electric charges are dissipated by means of the brush assembly and the retainer.

Preferably, the spring exerts an axial force on the retainer that is greater than the friction torque exerted by the conductive fibers on the shaft.

Advantageously, the radial portion of the mounting plate is mounted to bear axially against one of the front-end faces of the bearing.

BRIEF DESCRIPTION OF THE SEVERAL VIEWS OF THE DRAWINGS

The present invention will be better understood on studying the detailed description of embodiments, taken as non-limiting examples and illustrated by the attached drawings in which.

DETAILED DESCRIPTION OF THE INVENTION

Figure 1:
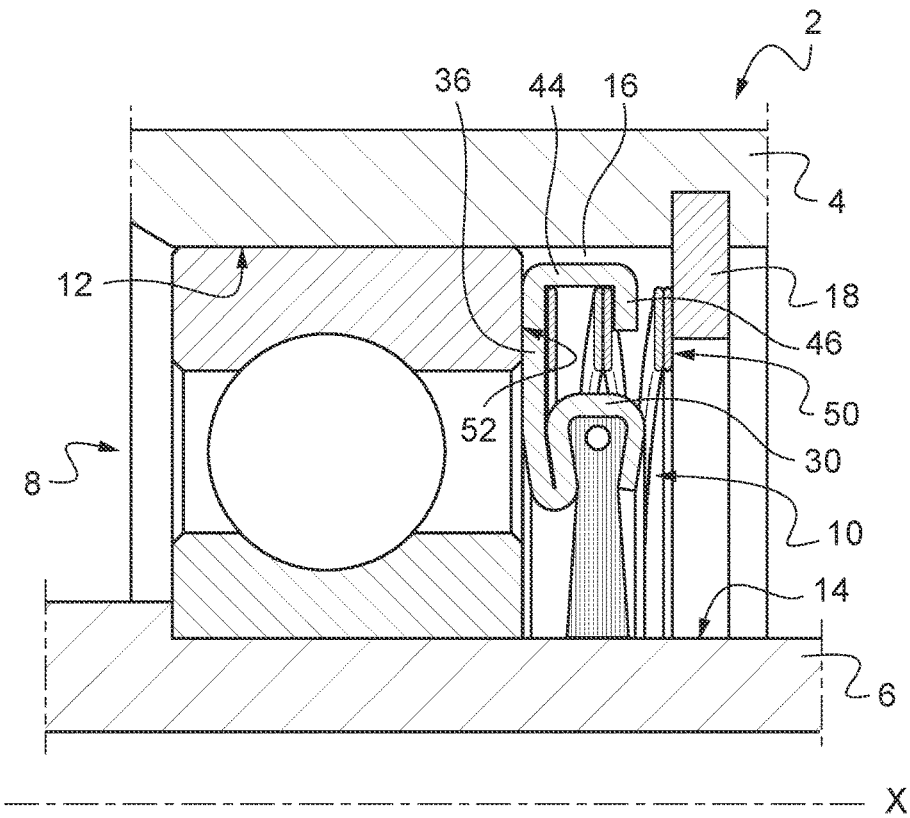
FIG. 1 is an axial cross-sectional view of a grounding brush assembly mounted radially between a rotary shaft and an electric motor casing according to a first exemplary embodiment of the invention.

FIG. 1 depicts, in axial cross-section, a part of an electric motor or machine 2 comprising a fixed casing 4, a rotary shaft 6 rotatable about axis X-X and supported radially by a bearing 8, the bearing 8 being axially free or displaceable in at least one direction. The bearing 8 is preferably a rolling bearing, most preferably a ball bearing, but may alternatively include any other appropriate type of rolling element, such as cylindrical or tapered rollers, needles, etc. Alternatively, the bearing 8 may be formed as a plain bearing.

The motor 2 further comprises a grounding brush assembly 10 mounted radially between the bore 12 of the casing 4 and the outer cylindrical surface 14 of the shaft 6. The grounding brush assembly 10 is dimensioned or sized radially so as to provide a radial play 16 or radial clearance between the assembly 10 and the bore 12 of the casing 4, the assembly 10 being thus mounted axially free. Thus, the assembly 10 is not force-fitted within the bore 12 of the casing 4.

The motor 2 further comprises a retainer 18 fixed to the casing 4 and protruding radially inwardly with respect to the bore 12 of the casing 4. The retainer 18 is preferably formed as a retaining ring or circlip. Alternatively, the retainer 18 may be formed as a part of the casing 4, for example as a shoulder of the casing 4.

Figure 2:
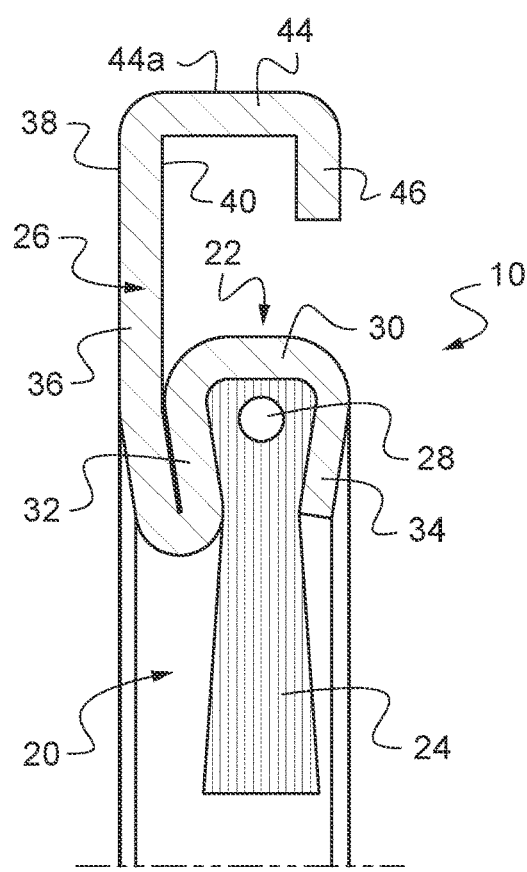
FIG. 2 is a radial cross-sectional view of the assembly of FIG. 1.

As best shown in FIG. 2, the grounding brush assembly 10 has a generally annular form. The assembly 10 basically comprises a grounding brush 20 including a support 22 and conductive fibers 24 housed within the support 22, as well as a mounting plate 26 connected with the support 22. The mounting plate 26 is either integrally formed with the support 22 or is separately formed and attached to the support 22.

More specifically, the brush 20 includes a plurality of the conductive individual fibers 24 distributed or spaced circumferentially about the shaft 6 of the motor 2. The conductive fibers 24 may be formed of carbon, stainless steel, conductive plastics (e.g., acrylic fibers or nylon) or any other appropriate conductive materials. In the illustrated example, the conductive fibers 24 are folded or bent around a link wire 28. The free distal end or ends of each conductive fiber 24 is intended to come into radial contact with the outer surface 14 of the shaft 6.

To ensure mounting and retention of the conductive fibers 24, the support 22 preferably includes a mounting portion 30, a first lateral sidewall or lip 32 extending from one side of the mounting portion 30, and a second lateral sidewall or lip 34 extending from the other side of the mounting portion 30.

The mounting plate 26 has an annular form and extends substantially radially. The mounting plate 26 preferably includes an annular radial portion 36 extending radially outwardly from the mounting portion 30 of the support 22. The radial portion 36 has two opposite front-end faces 38, 40 delimiting its axial thickness. The free end of the radial portion 36 is the large-diameter edge of the radial portion 36.

The mounting plate 26 further includes an annular axial portion 44 extending axially from the radial portion 36 of the mounting plate 26. Specifically, the axial portion 44 extends from the large-diameter edge of the radial portion 36. The axial portion 44 at least partly radially surrounds and is spaced radially outwardly from the mounting portion 30 of the support 22. The axial portion 44 preferably extends entirely axially, but may alternatively extend both axially and radially, i.e. obliquely, inwardly or outwardly. The outer surface 44a of the axial portion 44 defines the outer diameter of the grounding brush assembly 10. The radial clearance or play 16 (FIG. 1) is defined between the outer surface 44a of the axial portion 44 and the bore 12 of the casing 4.

Further, the mounting plate 26 preferably further includes an annular retaining portion 46 extending radially inwardly from the axial portion 44 of the mounting plate 26. In the depicted exemplary embodiment, the retaining portion 46 extends from the free end of the axial portion 44. Preferably, the retaining portion 46 extends entirely radially, but may alternatively extend both radially and axially, i.e. obliquely, toward the radial portion 36 of the mounting plate 26. In the depicted exemplary embodiment, the mounting plate 26 includes a single retaining portion 46. However, the mounting plate 26 may alternatively include a plurality of retaining portions 46 spaced apart from one another, preferably regularly or evenly circumferentially spaced apart. Furthermore, the mounting plate 26 is preferably formed of a metallic material, for example, formed from a metallic plate or blank in a cutting and stamping operation.

Referring once again to FIG. 1, the grounding brush assembly 10 preferably further comprises a spring 50 at least partly disposed axially between the radial portion 36 and the retaining portion 46 of the mounting plate 26. Another or remaining part of the spring 50 is disposed axially between the retaining portion 46 of the mounting plate 26 and the retainer 18. In the depicted exemplary embodiment, the spring 50 remains radially at a distance from the bore of the casing 4. As a variant, the spring 50 could come to be centered in the bore of the casing 4 while remaining axially bearing against the retainer 18.

The spring 50 is partly disposed radially between the mounting portion 30 of the support 22 and the axial portion 44 of the mounting plate 26. In the depicted exemplary embodiment, the spring 50 is in radial contact with a bore or inner surface of the axial portion 44 of the mounting plate 26. Alternatively, the spring 50 may be in radial contact with the outer surface of the mounting portion 30 of the support 22, or may even be in radial contact with both of the bore/inner surface of the axial portion 44 and the outer surface of the mounting portion 30.

The retaining portion 46 of the mounting plate 26 cooperates or engages with one or more turns or coils of the spring 50 to ensure the axial retention of the spring 50 relative to the mounting plate 26. The retaining portion 46 cooperates/engages by direct contact with a turn/coil of the spring 50. Thereby, the retaining portion 46 forms a means of attachment of the spring 50.

In the depicted exemplary embodiment, the spring 50 is a helical spring having coils each having a rectangular section or shape. Alternatively, the coils of spring 50 may be formed having other sections/shapes, for example square or circular.

As a further alternative, the spring 50 may be formed as a stack of conical Belleville washers or as a solid compressible cylinder or tube.

During operation of the motor 2, the grounding brush assembly 10 is in contact with the shaft 6 and the radial portion 36 of the mounting plate 26 bears axially against, or is disposed against, the front-end face 52 of the bearing 8, such that electrical charges that accumulate on the shaft 6 during the operation of the motor 2 are dissipated. Specifically, such electrical charges are transferred from the shaft 6 to the mounting plate 26 and the support 22 of the grounding brush assembly 10, then from the spring 50 of the assembly 10 to the retainer 18, and finally from the retainer 18 to the bore 12 of the casing 4.

The spring 50 also enables radially centering of the grounding brush assembly 10 within the bore 12 of the casing 4. In other words, the grounding brush assembly 10 is self-centered within the bore 12 of the casing 4.

In the depicted exemplary embodiment, the mounting plate 26 is formed in a single piece with the support 22, i.e., the mounting plate 26 and the support 22 are of one-piece construction. Thus, the mounting plate 26 is therefore integral to the support 22. Specifically, the first lateral sidewall or lip 32 of the support 22 extends to a small-diameter edge of the radial portion 36 of the mounting plate 26. The first lateral lip 32 is folded or bent and comes to bear against the radial portion 36 to form a fold and locally obtain a double thickness of the material of the support 22 and mounting plate 26. That is, the first lateral sidewall/lip 32 bears against the front-end face 40 of the radial portion 36.

The mounting portion 30 of the support 22 extends axially from the first lateral sidewall or lip 32 on the side opposite to the radial portion 36 of the mounting plate 26. The mounting portion 30 extends from a large-diameter edge of the first lateral lip 32. Preferably, the mounting portion 30 extends substantially or entirely axially as depicted, but may alternatively extend obliquely.

The second lateral sidewall or lip 34 extends radially inwardly from the mounting portion 30 of the support 22. Specifically, the second lateral lip 34 extends from the mounting portion 30 on the axial side opposite to the first lateral sidewall/lip 32.

Further, the mounting portion 30 and the first and second lateral lips 32, 34 are of annular form and delimit a channel that is radially open on the inner radial side and inside which are disposed an outer radial end of the conductive fibers 24. Preferably, the first and second lateral lips 32, 34 axially grip the plurality of conductive fibers 24. Thus, the conductive fibers 24 axially bear on either side against the first and second lateral lips 32, 34.

In the depicted exemplary embodiment, the conductive fibers 24 bear radially against the mounting portion 30 and the first and second lateral lips 32, 34 extend obliquely inwardly from the mounting portion 30. Alternatively, the first and second lateral lips 32, 34 may extend entirely radially from the mounting portion 30.

Preferably, the radial portion 36, the axial portion 44, the retaining portion 46, the first lateral sidewall/lip 32, the mounting portion 30 and the second lateral sidewall/lip 34 are formed in a single piece, i.e., are of one-piece construction, for example produced by cutting and stamping an electrically conductive material, such as for example, aluminum, stainless steel, bronze, copper or another appropriate conductive material.

As previously described, in the depicted exemplary embodiment, the retaining portion 46 of the mounting plate 26 has an annular form. Alternatively, the mounting plate 26 may include a plurality of retaining portions 46 extending radially inwardly and circumferentially from the axial portion 44 of the mounting plate 26 over a limited angular segment, for example lying between 5° and 15°, and spaced apart from each other, preferably regularly or evenly.

As a variant, the mounting plate 26 may include several axial portions 44 extending both axially and circumferentially from the radial portion 36 of the mounting plate 26 over a limited angular segment, for example lying between 5° and 15°, and spaced apart from one another, preferably regularly or evenly. In such a variant, each one of the axial portions 44, or only certain axial portions 44, are provided with a separate retaining portion 46.

Figure 3:
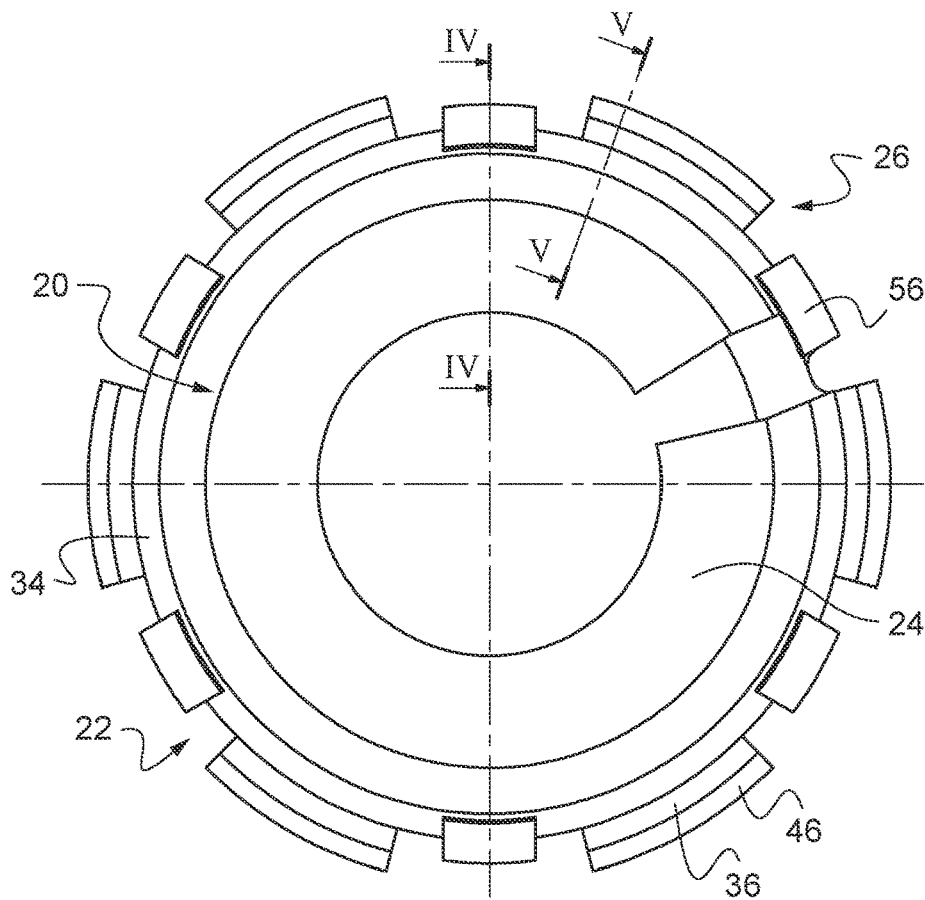
FIG. 3 is a front view of a grounding brush assembly according to a second exemplary embodiment of the invention.
Figure 4:
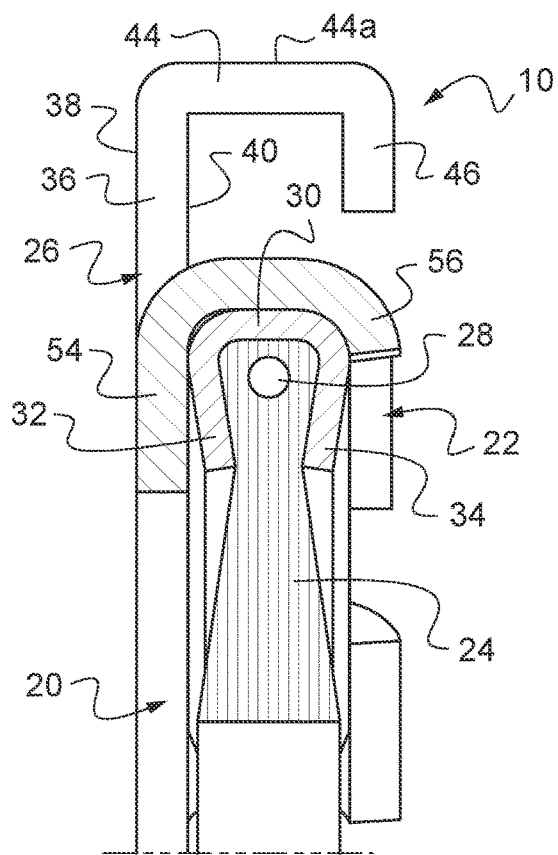
FIG. 4 is a cross-sectional view on the axis IV-IV of FIG. 3.
Figure 5:
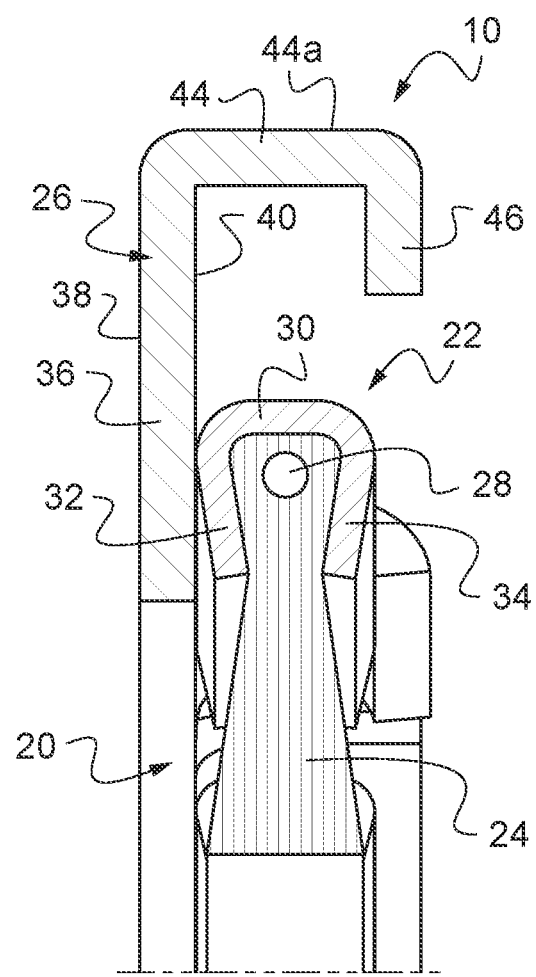
FIG. 5 is a cross-sectional view on the axis V-V of FIG. 3.

The exemplary embodiment illustrated in FIGS. 3 to 5, in which the identical elements bear the same references, differs from the example illustrated in FIGS. 1 and 2 in that the mounting plate 26 and the support 22 of the brush 20 are formed as two distinct or separate parts that are connected or coupled together.

In this embodiment, the mounting plate 26 includes a main body 54 bearing axially against, i.e., disposed axially against, the sidewall or lip 34 of the support 22, a plurality of tongues 56 for axial and radial retention of the brush 20, and a plurality of radial portions 36. In the depicted example, the mounting plate 26 includes six radial portions 36 and six retaining tongues 56 spaced apart regularly or evenly in the circumferential direction. In this example, the conductive fibers 24 of the brush 20 are formed as an open ring.

The retaining tongues 56 extend from the main body 54 and are spaced circumferentially apart from each other, the radial portions 36 being disposed in the circumferential direction between two successive retaining tongues 56. Each retaining tongue 56 extends from the main body 54 such that the retaining tongues 56 each locally radially surrounds the support 22 of the brush 20 by being in both radial and axial contact with the support 22. The support 22 is thus held axially and radially by the plurality of retaining tongues 56.

The radial portions 36 extend entirely radially from the main body 54. Each radial portion 36 extends or projects radially outwardly with respect to the mounting portion 30 of the support 22. The radial portions 36 are spaced circumferentially apart from each other, preferably regularly or evenly.

A separate axial portion 44 extends axially from each one of the radial portions 36. Specifically, each axial portion 44 extends from a large-diameter edge of the associated radial portion 36 of the mounting plate 26. Further, each axial portion 44 is offset radially outwardly with respect to the mounting portion 30 of the support 22 and is thus radially spaced apart from the mounting portion 30. Preferably, each axial portion 44 extends entirely axially, but alternatively, each axial portion 44 may extend both axially and radially, i.e. obliquely, inwardly or outwardly. The outer surfaces 44a of all of the axial portions 44 collectively define the outer diameter of the grounding brush assembly 10. When positioned mounted inside the casing 4, the radial play or clearance remains between the outer surfaces 44a of all the axial portions 44 and the bore 12 of the casing 4.

Further, a retaining portion 46 extends radially inwardly from each axial portion 44. In the depicted exemplary embodiment, each retaining portion 46 extends inwardly from the free end of the associated axial portion 44 and extends entirely radially. Alternatively, each retaining portion 46 may extend both radially and axially, i.e. obliquely, toward the radial portion 36 of the mounting plate 26. As a variant, only certain axial portions 44 may be provided with a retaining portion 46.

In the depicted example, a circumferential space is formed or defined between each radial portion 36 and each adjacent retaining tongue 56. In another embodiment, the number of radial portions 36 may differ from the number of retaining tongues 56. Also, the circumferential dimension or length of each radial portions 36 may differ from the circumferential dimension/length of each retaining tongue 56. Further, the plurality of radial portions 36 and the plurality of retaining tongues 56 may be unevenly spaced or distributed in the circumferential direction.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:
   a grounding brush having a plurality of conductive fibers;
   a support including a mounting portion, the conductive fibers being housed within the mounting portion, and first and second lateral lips extending from the mounting portion and axially gripping the conductive fibers; and
   a mounting plate connected with the support and having at least one radial portion extending radially outwardly from the mounting portion of the support, at least one axial portion extending axially from the radial portion of the mounting plate, the at least one axial portion at least partially radially surrounding and being spaced radially apart from the mounting portion of the support, and at least one retaining portion extending radially inwardly from the at least one axial portion.

2. The grounding brush assembly according to claim 1, wherein the retaining portion of the mounting plate extends from the free end of the axial portion of the mounting plate.

3. The grounding brush assembly according to claim 1, wherein the radial portion of the mounting plate extends entirely radially.

4. The grounding brush assembly according to claim 1, wherein the axial portion of the mounting plate extends entirely axially.

5. The grounding brush assembly according to claim 1, wherein the at least one radial portion of the mounting plate includes a plurality of radial portions spaced circumferentially apart.

6. The grounding brush assembly according to claim 1, wherein the mounting plate and the support are formed as a single piece.

7. The grounding brush assembly according to claim 1, wherein the mounting plate includes a plurality of tongues configured to axially and radially retain the support.

8. The grounding brush assembly according to claim 1, further comprising a spring having a plurality of coils and being disposed at least partially axially between the radial portion of the mounting plate and the retaining portion of the mounting plate and at least partially radially between the mounting portion of the support and the axial portion of the mounting plate, the retaining portion of the mounting plate engaging with at least one of the coils of the spring so as to axially retain the spring relative to the mounting plate.

9. An electric motor comprising:
   a casing having a bore;
   a shaft disposed within the bore of the casing;
   a grounding brush assembly mounted radially between the casing and the shaft and including:
     a grounding brush having a plurality of conductive fibers;
     a support including a mounting portion, the conductive fibers being housed within the mounting portion, and first and second lateral lips extending from the mounting portion and axially gripping the conductive fibers;
     a mounting plate connected with the support and having at least one radial portion extending radially outwardly from the mounting portion of the support, at least one axial portion extending axially from the radial portion of the mounting plate, the at least one axial portion at least partially radially surrounding and being spaced radially apart from the mounting portion of the support, and at least one retaining portion extending radially inwardly from the at least one axial portion; and
     a spring having a plurality of coils and being disposed at least partially axially between the radial portion of the mounting plate and the retaining portion of the mounting plate and at least partially radially between the mounting portion of the support and the axial portion of the mounting plate, the retaining portion of the mounting plate engaging with at least one of the coils of the spring so as to axially retain the spring relative to the mounting plate;
   at least one bearing disposed between the shaft and the bore of the casing; and
   a retainer secured to the casing, the spring being disposed axially between the radial portion of the mounting plate and the retainer, the conductive fibers of the grounding brush assembly being in contact with the shaft and a radial clearance being defined between the mounting plate and the bore of the casing.

10. The motor according to claim 9, wherein the radial portion of the mounting plate is mounted to bear axially against one of the front-end faces of the bearing.

11. The motor according to claim 9, wherein the retaining portion of the mounting plate extends from the free end of the axial portion of the mounting plate.

12. The motor according to claim 9, wherein the radial portion of the mounting plate extends entirely radially.

13. The motor according to claim 9, wherein the axial portion of the mounting plate extends entirely axially.

14. The motor according to claim 9, wherein the at least one radial portion of the mounting plate includes a plurality of radial portions spaced circumferentially apart.

15. The motor according to claim 9, wherein the mounting plate and the support are formed as a single piece.

16. The motor according to claim 9, wherein the mounting plate includes a plurality of tongues configured to axially and radially retain the support.

\* \* \* \* \*